United States Patent [19]

Müller

[11] 4,225,441
[45] Sep. 30, 1980

[54] FILTER ELEMENT

[75] Inventor: Hans Müller, Erlenbach, Switzerland

[73] Assignee: Chemap AG, Männedorf, Switzerland

[21] Appl. No.: 970,434

[22] Filed: Dec. 18, 1978

[30] Foreign Application Priority Data

Dec. 22, 1977 [CH] Switzerland ............... 15864/77
Dec. 23, 1977 [CH] Switzerland ............... 15939/77

[51] Int. Cl.³ ................................... B01D 29/14
[52] U.S. Cl. ..................................... 210/356; 210/483
[58] Field of Search ............... 210/323 T, 333 R, 346, 210/356, 461, 483, 484, 486; 261/94–98, DIG. 72

[56] References Cited

U.S. PATENT DOCUMENTS

| 2,183,657 | 12/1939 | Page | 261/DIG. 72 |
| 3,506,248 | 4/1970 | Starbuck et al. | 261/DIG. 72 |
| 3,659,718 | 5/1972 | Brociner et al. | 210/333 R |
| 4,111,813 | 9/1978 | Preus | 210/484 X |

FOREIGN PATENT DOCUMENTS 1948774  5/1970  Fed. Rep. of Germany ....... 210/323 T Primary Examiner—William A. Cuchlinski, Jr.
Attorney, Agent, or Firm—Michael J. Striker

[57] ABSTRACT

A filter element includes a filter material which has an outer surface for accumulating a filter cake thereon and an inner surface. A plurality of supports is provided for supporting the filter element at the inner surface thereof. Adjacent ones of the supports define spaces between themselves. At least portions of the filter material bend inwardly into these spaces between the adjacent supports and relative to the remaining parts of the filter material, under the pressure of a medium to be filtered which is supplied onto the outer surface of the filter material. During backflushing of the filter element these portions bend outwardly of the spaces and the filter cake is thereby dislodged from the outer surface of the filter material.

9 Claims, 6 Drawing Figures

FILTER ELEMENT

BACKGROUND OF THE INVENTION

The present invention relates to filter elements.

More particularly, the present invention concerns tubular filter elements for filtering liquids in a pressure filter apparatus.

It is known in the prior art (see German Offenlegungsschrift No. 2,741,639) to provide a tubular filter element for a pressure filter. Such a filter element is closed at its lower side and is open at its upper side which is fixed on a supporting member. The side walls of the filter element bound an interior which is filled with a loose filling material. The filling material includes a plurality of ball-shaped members of known material. The balls are so closed-packed that the outer surfaces of the filter element are supported by them in a substantially smooth configuration. Filtrate is directed into the filter element from outside and filtrant leaves the element from the inside of the same.

Such a filter element has a disadvantage, in that the filter cake which formes at the exterior of the filter element does not, during back flushing, drop everywhere and completely from all parts of the outer surface of this filter element. Only a partial removal of the filter cake takes place and this results in local drops in pressure along the outer surface, which fact prevents clean removal of the remaining parts of the filter cake from this surface.

SUMMARY OF THE INVENTION

It is a general object of the present invention to avoid the disadvantages of the prior art filter elements.

More particularly, it is an object of the present invention to provide a filter element the filter material of which assumes during the filtration process a wavy configuration and returns to a straight (smooth) configuration during backflushing of the filter element.

It has been proved to be advantageous in many cases if the filter cloth, especially during the filtration process, assumes an inwardly bent (i.e. wavy) configuration. During back flushing of the filter element by means of liquid or gas, the inwardly bent portions of the filter cloth bend in a reverse direction (i.e. outwardly relative to the interior of the filter element) so that the outer surface of the filter cloth becomes smooth or is even bowed outwardly to some extent. This reversal causes the filter cake to be dislodged quickly and completely from the outer surface of the filter cloth. After the filter cake is removed from the filter element, the latter is ready for future use in filtration processes, during which the filter cloth again assumes an inwardly bent configuration, as described before.

In pursuance of these objects and others which will become apparent hereafter, one feature of the present invention resides in providing a filter material having an outer surface for accumulating a filter cake thereon, and an inner surface. There is provided a plurality of supports for supporting said filter material at said inner surface thereof and defining space between adjacent ones of said supports. At least portions of said filter material bend inwardly into said spaces between said adjacent supports and relative to the remaining parts of said filter material under the pressure of a medium to be filtered which is supplied onto said outer surface of said filter material. During backflushing of the filter element said portions bend outwardly of said spaces and the filter cake is thereby dislodged from said outer surface.

In accordance with a preferred embodiment of the present invention the filter material bounds an interior which is filled with the loose supports. The supports preferably have ball-like configuration; however, it is possible to provide supports of any other configuration.

The dimensions of the spaces between the adjacent supports (i.e. balls) depend on the outer dimension of the supports and on the packing density of the supports in the interior of the filter element. Thus, the dimensions of the spaces (for example the depth thereof) are chosen and may be varied depending upon the kind of medium to be filtered and the amount of the filter cake which is supposed to be accumulated on the outer surface of the filter material.

It is especially advantageous to use supports of material which is resistant to chemicals and high temperatures. Depending upon the actual medium to be filtered, different synthetic plastic materials may be chosen for the supports, such as thermoplastic or thermosetting plastics, elastomers or cellulose derivatives. However, there may also be used materials which have a specific gravity smaller than 1, for example expanded clay, which in order to seal its porous outer surface is covered with synthetic plastic material. It has proved to be advantageous to cover the expanded clay supports with epoxy resin. It is also possible to use ceramic or glass supports.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
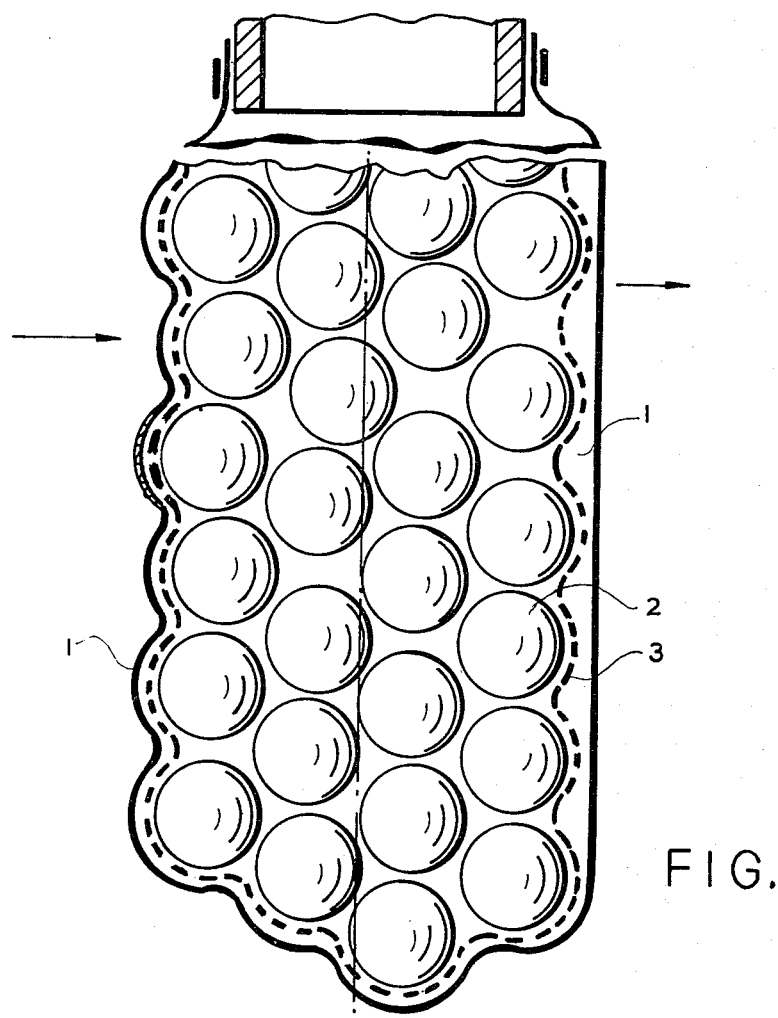
FIG. 1 is a longitudinal sectional view of a filter element in accordance with the present invention.
Figure 2:
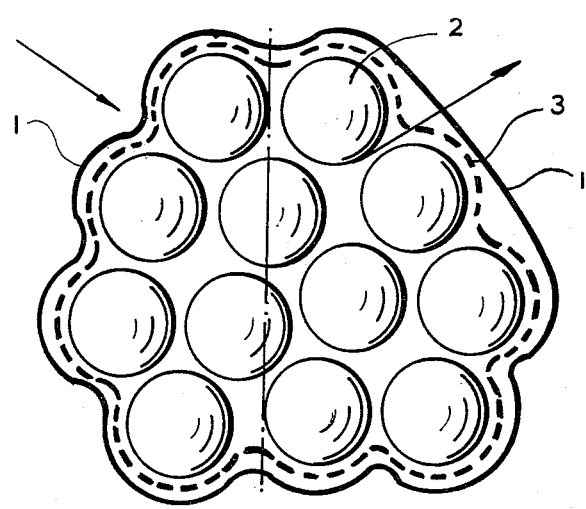
FIG. 2 is a cross-sectional view of the filter element shown in FIG. 1.

Referring now to the drawings and first to FIGS. 1 and 2 thereof, it may be noted that the left side of each of them shows in broken lines the position of the filter material of a filter element during the filtration process whereas the right side of each of the drawings shows in solid lines the position of the same filter material during backflushing of the filter element. An arrow at the left side shows the flow direction of a medium to be filtered relative to the filter element; the arrow at the right side shows the flow direction of the backflushing liquid.

The filter material bounds an interior of the tubular filter element which is closed at its lower end and is open at its upper end. The interior of the tubular filter element is filled with a plurality of loose bodies (i.e., balls 2). The material of the balls is chosen so as to provide the required temperature stability and corrosion resistance with regard to the medium to be filtered. It is advantageous to use balls 2 of synthetic plastic material, due to the light weight and inexpensive production of such a material.

The balls 2 may directly contact the filter material 1. However, it is also possible to hold the balls 2 within a wide-mesh net 3. In this case the filter material 1 is tightened around the net 3.

The balls 2 are so loosely received in the interior of the filter element that there are free spaces left between adjacent balls 2.

During the filtration process the medium to be filtrated is directed under pressure into the filter element from outside and filtrate leaves the filter element from the inside of the same. The element will be installed in a pressure vessel and its open end will communicate with the outside so that filtrate can leave through this open end. Under the pressure of the medium to be filtered which is supplied onto the outer surface of the filter material 1, the same is pressured against the balls 3. Some portions of the filter material 1 thereby bend or indent inwardly relative to the outer parts thereof, into the spaces between adjacent ones of the balls 2. In the cause of filtration a filter cake is accumulated on the outer surface of the filter material.

It is to be understood that the dimensions (especially the depth) of the indentations of filter material depend on the outer diameter of the balls 2 and the packing density of these balls in the filter element. Obviously, the dimensions of the indentations may be varied depending, for example, on the filter cake to be accumulated on the outer surface of the filter material 1.

It is also possible to use, together with the medium to be filtered, a filter aid (e.g. diatomaceous earth) so as to facilitate accumulation of the filter cake on the outer surface of the filter material.

Figure 3:
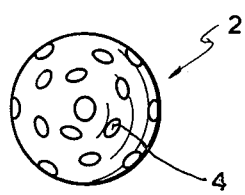
FIGS. 3-5 are different embodiments of supports of the filter element.
Figure 4:
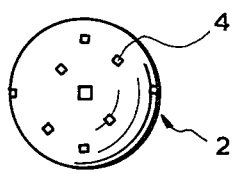
Figure 5:
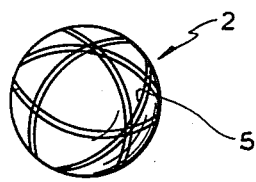

The balls 2 may be shaped differently. Thus, for example, FIG. 3 shows a ball which has a plurality of throughgoing circular bores 4. FIG. 4 shows throughgoing rectangular bores 4. FIG. 5 shows grooves 5 extending circumferentially on the outer surface of the ball 2. The grooves 5 may criss-cross one another, or may extend parallel to one another. The grooves 5 may, for example, have a concave cross-section or a square cross-section.

When the filter process is over, the remaining filtrate liquid is first withdrawn from the interior of the filter element. Thereafter, during back flushing the filter cake is removed from the outer surface of the filter material 1, for example, by means of gas (or liquid) backblowing. Under the pressure of the backflushing gas or liquid, the filter material stretches outwardly relative to the spaces between the balls 2 (see the solid line), and in doing so the filter cake on it is dislodged from the outer surface of the filter material 1.

The main field of application of the filter element in accordance with the present invention is for filtering liquids in a pressure filter element, which is used, for example, in a pressure vessel.

Figure 6:
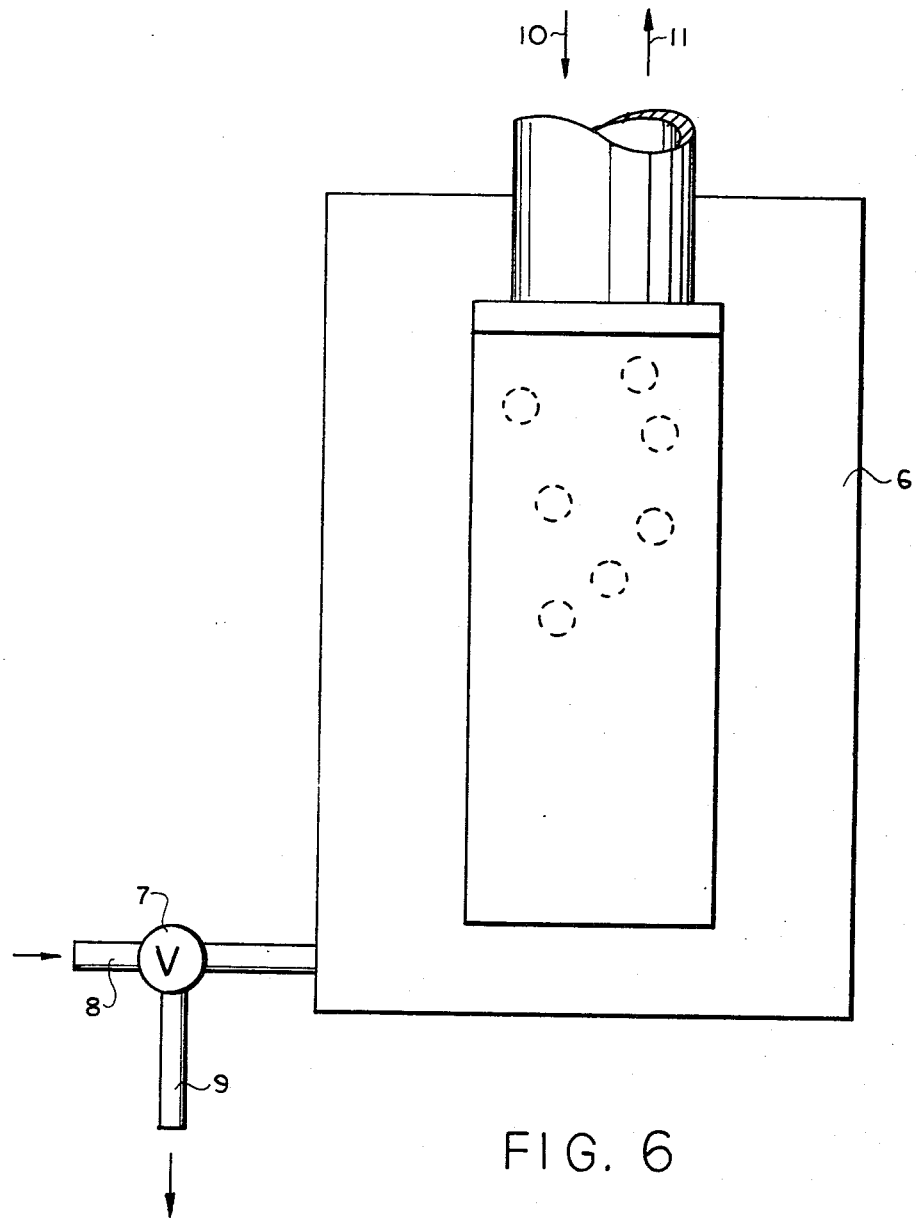
FIG. 6 is a diagrammatic view of the filter element in a pressure vessel.

FIG. 6 shows the filter element in accordance with the present invention in a pressure vessel 6.

During the filtration process the medium to be filtered is introduced under pressure through an inlet conduit 8 and a valve 7 into the vessel 6. The medium runs through the filter element from outside and the filtrate leaves the element from inside of the same (see arrow 10).

During backflushing the flushing medium is introduced from outside of the vessel 6 into the filter element (see arrow 11). The flushing liquid leaves the element from inside into the interior of the vessel 6, dislodging the filter cake from the outer surface of the filter element. The flushing medium, together with the filter cake, leaves the pressure vessel 6 through the valve 7 (which is correspondingly set) into an outlet conduit 9.

It will be understood that each of the elements described above, or two or more together, may also find a useful application in other types of a filter element, differing from the types described above.

While the invention has been illustrated and described as embodied in a filter element, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A filter element, particularly for a pressure filter, comprising a filter material having an outer surface for accumulating a filter cake thereon and an inner surface, said filter material bounding an interior of a tubular member having a closed lower end and an open upper end, and a plurality of supports forming separate loose ball-shaped bodies received in said interior, said bodies being of expanded clay covered with synthetic plastic material, said supports being operative for supporting said filter material at said inner surface thereof and defining spaces between adjacent ones of said supports, at least portion of said filter material bending inwardly into said spaces between said adjacent supports and relative to the remaining parts of the filter material under the pressure of a medium to be filtered which is supplied onto said outer surfaces of said filter material, so that during backflushing of the filter element said portions bend outwardly of said spaces and the filter cake is thereby dislodged from said outer surface.

2. A filter element, particularly for a pressure filter, comprising a filter material having an outer surface for accumulating a filter cake thereon, and an inner surface; and a plurality of loose ball-shaped bodies of expanded clay covered with synthetic plastic material, said bodies being operative for supporting said filter material at said inner surface thereof and defining spaces between adjacent ones of said bodies, at least some portions of said filter material bending inwardly into said spaces between said adjacent bodies under the pressure of a medium to be filtered which is supplied onto said outer surface of said filter material, so that the latter assumes irregular wave-like configuration defined by said some portions bent inwardly into said spaced and relative to the remaining parts of said filter material supported by said ball-shaped bodies, said some portions bending outwardly of said spaced during backflushing of the filter element so as to dislodge the filter cake from said outer surface.

3. An element as defined in claim 2, wherein said bodies are provided with a plurality of throughgoing bores.

4. An element as defined in claim 2, wherein at least some of said bodies have bores of a circular cross-section.

5. An element as defined in claim 2, wherein at least some of said bodies have bores of a square cross-section.

6. An element as defined in claim 2, wherein said bodies are provided with a plurality of grooves extending on the outer surfaces of said bodies.

7. An element as defined in claim 6, wherein at least some of said grooves have a concave cross-section.

8. An element as defined in claim 6, wherein at least some of said grooves have a square cross-section.

9. An element as defined in claim 2, wherein said filter material forms a freely suspended bag having a closed lower end and open upper end and accommodating said bodies in its interior.

* * * * *